Dec. 1, 1964 W. H. RHODES ETAL 3,159,705
COORDINATE CONVERSION AND RADAR GATING SIMULATOR APPARATUS
Filed Nov. 22, 1960 2 Sheets-Sheet 1

WILLIAM H. RHODES
JAMES DAVID BRYAN
INVENTORS.

BY THOMAS J. HOLDEN
DONALD M. SANDLER
ATTORNEYS

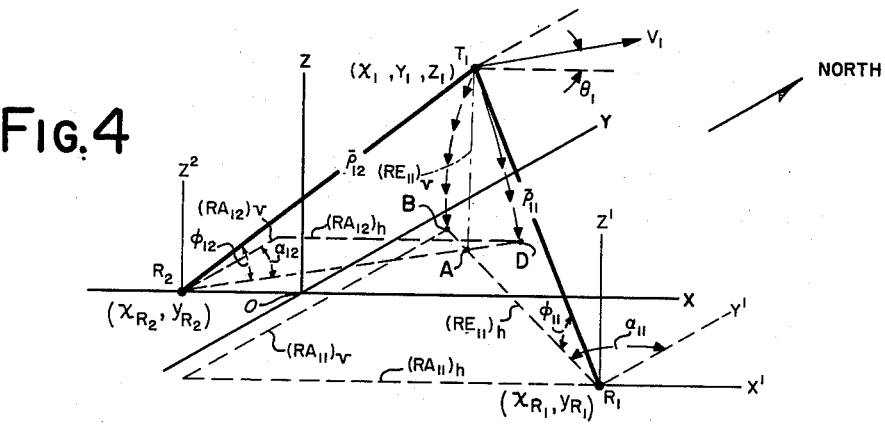
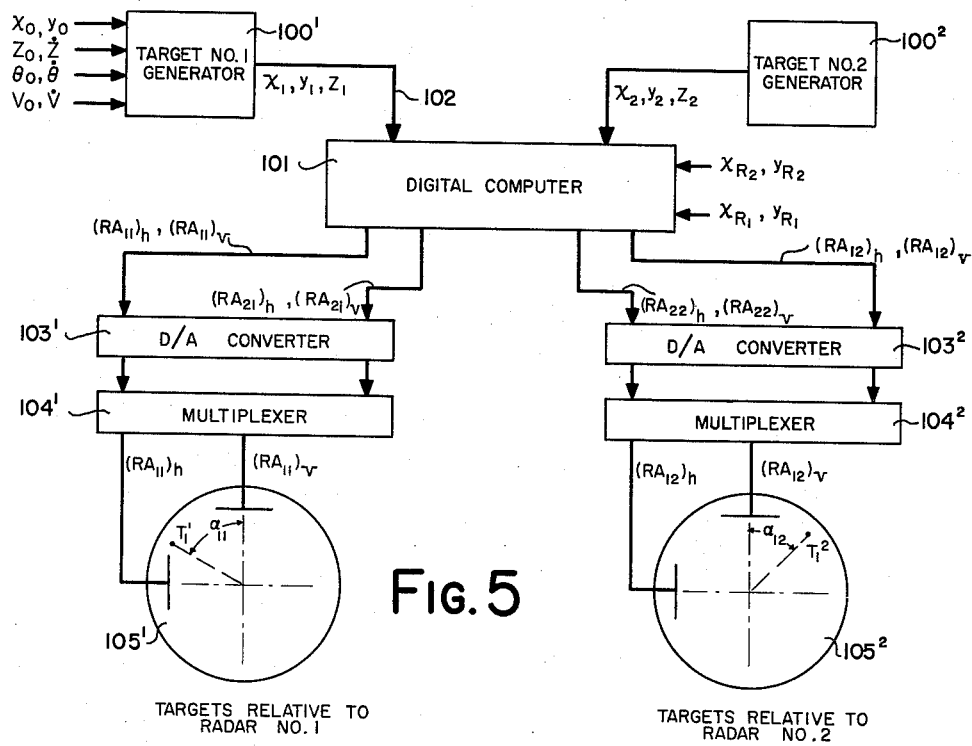

3,159,705
COORDINATE CONVERSION AND RADAR
GATING SIMULATOR APPARATUS
William H. Rhodes and James David Bryan, Baltimore, Md., assignors to Aircraft Armaments, Inc., Cockeysville, Md., a corporation of Maryland
Filed Nov. 22, 1960, Ser. No. 70,953
9 Claims. (Cl. 35—10.4)

This invention relates to radar target simulation, and more particularly to the simulation of many targets covered by several radars at different locations.

In the air traffic environment over a given geographical area, two radars at different locations may detect the same aircraft. Using PPI presentation, for example, such aircraft appears to each radar at different slant ranges and azimuths as determined by the spatial location of the aircraft relative to the radars. In the past, this situation has been simulated by first generating the Cartesian coordinates of the target relative to a reference origin, then subtracting the radar coordinates relative to the origin to obtain the coordinates of the target relative to each radar. For two radars, two sets of relative coordinates are obtained, one for each radar. For PPI presentation, each set of relative coordinates is converted to the slant range and azimuth of the target relative to each radar, and gated into the radars in video form during the time the respective simulated radar beams would cover the target. Thus, for two radars and one target, two coordinate conversions and two gatings are required; for two radars and two targets, four coordinate conversions and four gatings are required. Coordinate conversion and gating is thus done in a conventional manner on a per target per radar basis.

This gives rise to a problem when the situation to be simulated includes a large number of targets and radars such as 50 targets and 5 radars, since the equipment to perform 250 coordinate conversions and 250 sets of range and azimuth gatings becomes unwieldy. It is therefore a primary object of this invention to reduce coordinate conversion and gating from a per target per radar basis to merely a per radar basis.

Before briefly describing how the primary object of this invention is accomplished, it is important to recall that a target in space is located relative to a reference origin by specifying values for three parameters. In Cartesian coordinates, the parameters are in terms of $x$, $y$ and $z$, while in spherical coordinates, the parameters are in terms of slant range, azimuth and elevation. Specific values of the latter parameters are determined by a radar. Any two of the three parameters can be chosen for display on the plane surface of a cathode ray tube screen. This can be seen from the fact that in a plane, the position of a point relative to coordinate axes can be defined with two coordinates. By properly selecting these coordinates, one may specify any two of the three target parameters of range, azimuth, and elevation that are desired. For example, the ordinate of a display point could be the specific value of one of the two desired target parameters, and the abscissa could be the specific value of the other of the two desired target parameters. In other words, if range and azimuth information were desired, the display point would be spaced from the horizontal axis a distance proportional to the range of the target relative to the radar, and from the vertical axis, a distance proportional to the azimuth of the target relative to the radar. In this case, the coordinates of the display point would be the range and azimuth of the target. Such coordinates are termed herein the "range-azimuth rectangular display coordinates" of the target. In an analogous manner, the "polar display coordinates" are the coordinates of a display point in a plane relative to an origin in the plane such that the position vector to the display point has a magnitude and direction which specify the values of the two desired target parameters. In other words, if display of the range and azimuth of a target were desired, the display point would be radially spaced from the origin a distance proportional to the range of the target from the radar, and positioned, relative to othogonal axes intersecting at the origin, at an angle which corresponds to the azimuth of the target. Generally speaking, then, the location of a display point in a plane can be used to specify any two of the three target parameters that can be measured by a radar. The coordinates of such display point are termed herein "display coordinates" and can be in polar or rectangular form.

In order to accomplish the primary object of this invention, the Cartesian coordinates of a target relative to a reference origin are converted to the display coordinates of the target relative to each radar. As above described, the display coordinates of a target are two in number and locate a point in a plane such that the location specifies two of the three target parameters that can be measured by a radar. Obviously, the particular two parameters chosen depend upon the particular type of scan on the radar indicator. In any event, the display coordinates of the target relative to a given radar in analogue form are applied to the deflection plates of a cathode ray tube. The target thus appears as an illuminated spot (display point) on the face of the CRT. If rectangular display coordinates are used, the ordinate and abscissa of the spot constitute specific values for the two desired target parameters. If polar display coordinates are used, the radial displacement and angular position of the spot constitutes specific values for the two desired target parameters. A plurality of targets appear as a plurality of illuminated spots. Where more than one radar is employed, a CRT for each radar is required, each target appearing on each CRT at the proper position to specify the two desired parameters of the target relative to the radar associated with the given CRT.

A photosensitive tube, such as an image orthicon, is positioned in front of a CRT so that indicia on the face thereof are focused on the surface of the tube that, in response to the light pattern, produces a corresponding positive-potential pattern. Such surface is scanned by the electron beam of the tube in a particular manner depending upon whether the display coordinates are in rectangular or polar form. If in rectangular form, the surface is scanned both vertically, from a horizontal line corresponding to a horizontal axis of the CRT, and horizontally thus covering a certain area of the face of the CRT. If the display coordinates are in polar form, the surface is scanned both radially from an origin corresponding to the origin of the CRT and rotationally about said origin thus covering a certain area of the face of the CRT. The video output of the photosensitive tube is made available to modulate the intensity of the scanning spot on the radar indicator. Then, by synchronizing the scanning of said surface of the tube with the scanning of a radar indicator, an illuminated spot representing the target is produced on the indicator at the instant the electron beam of the tube neutralizes the charge at the point on said surface corresponding to the illuminated spot on the CRT. For example, if the radar indicator has a type P scan and displays range-azimuth data in polar form, and the display point on the CRT has range-azimuth rectangular display coordinates, vertical scanning of the charged surface of the photosensitive tube is synchronized with the radial range sweep of the indicator. Horizontal scanning of the charged surface is synchronized with the rotation of the trace of electron beam on the indicator. Thus, to a radar operator, the indicator presents a showing which simulates a target at the correct range and azimuth.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

In the drawing:

FIGURE 4 is a schematic showing of the geometrical relationship between a single target and two radars at different locations.

FIGURE 5 is a block diagram showing coordinate conversion and target display.

Figure 1:
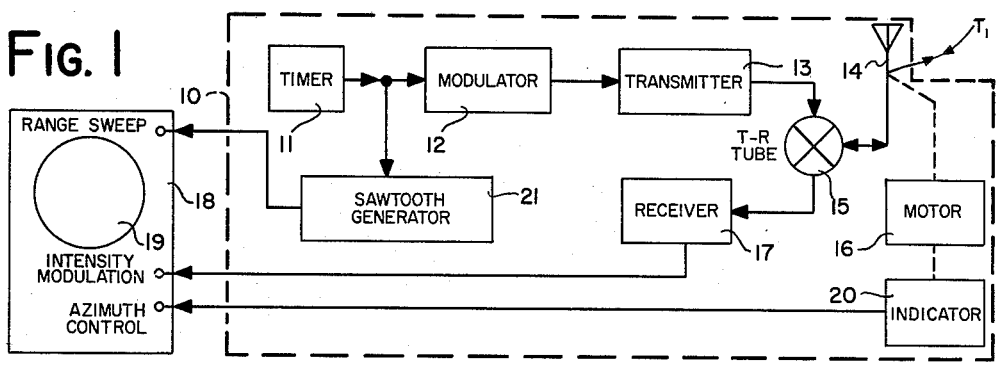
FIGURE 1 shows a conventional radar component connected to a radar indicator.

A block diagram for a conventional radar 10 is shown in FIGURE 1. Radar 10 includes timer or synchronizer 11, which produces timing triggers at regular intervals, and causes modulator 12 to key transmitter 13 for producing short bursts of RF energy at antenna 14 at a rate determined by the timing triggers. Antenna 14 is highly directional and usually takes the form of a dipole in conjunction with a parabolic reflector. To save space and weight, the same antenna is used for transmitting and receiving with T-R tube 15 serving as a switch to connect the antenna to the transmitter when it is pulsed and to the receiver at all other times. Since the antenna "sees" in only one drection, it is rotated around the radar by antenna motor 16. This process is termed searching, and the presence of targets in the area covered by the antenna beam is established by such searching.

Receiver 17 detects echo signals received at antenna 14 and applies a video signal to indicator 18. The indicator presents visually all the necessary information to locate the target on the indicator screen 19. The method of presenting the data depends on the purpose of the radar set. For navigation and surveillance purposes, type P scan is often used. In a type P scan, antenna 14 is rotated uniformly about a vertical axis to accomplish searching in a horizontal plane. The beam is usually narrow in azimuth and broad in elevation. Timer 11 causes a large number of pulses to be transmitted during the time that the angular position of the antenna traverses one beamwidth. The angular position is measured by synchro 20. Each trigger from timer 11 produces a sawtooth voltage which is applied to the range sweep control of indicator 18. As each pulse is transmitted from antenna 14, an unintensified spot is radially deflected from the center of screen 19. Upon reaching the edge of the screen, the spot quickly jumps back to the center. It begins another trace as soon as the timer causes the next pulse to be transmitted. As the antenna is rotated, the voltage from synchro 20 applied to the azimuth control causes the unintensified trace to rotate around the center of screen 19, the period of this rotation being very much larger than the period for radial deflection of the spot. Thus, the path of the spot rotates around the center of the screen so that the angular position of the radial line on which the spot appears indicates the azimuth of the antenna beam, and the radial displacement of the spot from the center indicates the slant range to the target. When antenna 14 receives an echo, receiver 17 produces a video output which, when applied to the control grid of the electron gun that produces the scanning spot, intensity modulates the scanning beam. Thus, an echo causes the illumination produced by the spot to be increased producing on the screen a bright spot with a radial displacement proportional to the range of the target producing the echo, and an angular position which is the same as the azimuth of such target.

It is seen, therefore, that the radar indicator above described presents a visual indication of specific values of the parameters of range and azimuth of the target. The specific value of the third parameter of elevation is not supplied by a type P scan. However, those skilled in the art are aware that other radars and indicators can determine target elevation so that specific values of all three parameters are attainable.

Figure 2:
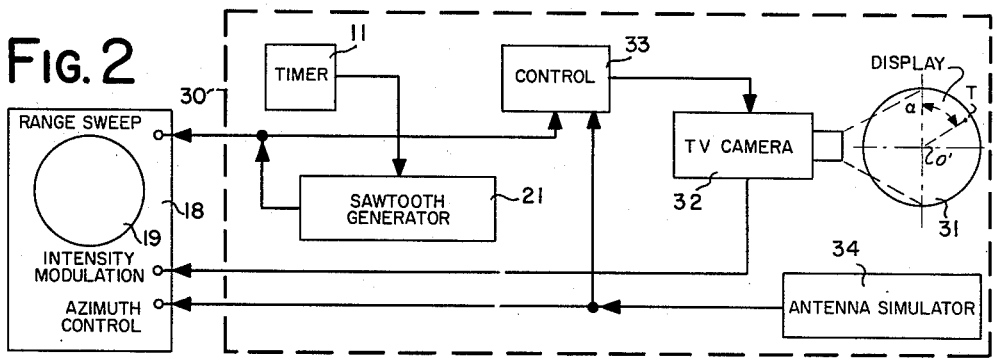
FIGURE 2 shows a device for simulating the radar components, said device being connected to a radar indicator.

The function of simulator 30 shown in FIGURE 2 is to provide indicator 19 with the same video information provided by radar 10 shown in FIGURE 1. Assume that display 31 has indicia located such that the radial displacement of indicium T relative to the point O' is a measure of the slant range of a target to a radar and the angular position of indicium T (the angle α) is a measure of target azimuth relative to the radar. The coordinates of indicium T relative to origin O' are termed the range-azimuth polar display coordinates of a target. The method and means for obtaining such coordinates are described in detail hereinafter. Focused on display 31 is TV camera 32. The scanning of camera 32 is governed by control 33 because scanning takes place in an unconventional manner. The output of antenna simulator 34 is applied to control 33 and to the azimuth control of indicator 18. The output of generator 21 is applied to control 33 and to the range sweep of indicator 18. Generator 21 produces an output each time a trigger is produced by timer 11. The video output of TV camera 32 is applied to the intensity modulation control of the indicator. Where a real radar and indicator are available, the radar timer, sawtooth generator and antenna pick-off can be applied to the indicator and only the TV camera and display are necessary adjuncts.

Figure 3:
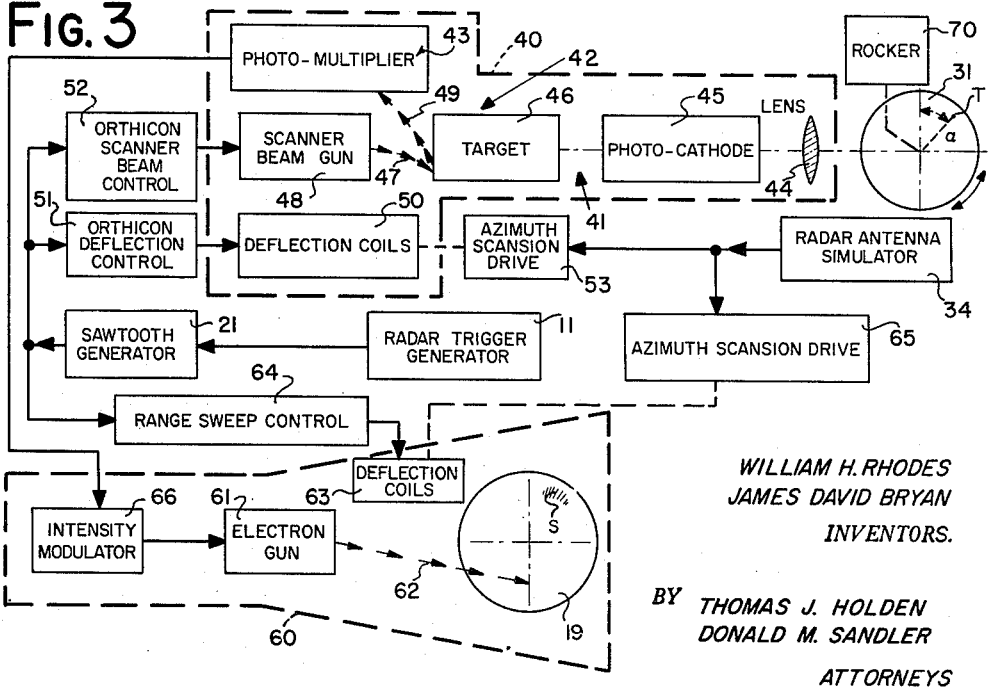
FIGURE 3 is a block diagram showing details of the device shown in FIGURE 2.

The operation of simulator 30 can best be understood by referring to FIGURE 3 which shows the photoemissive tube of camera 32 as image orthicon tube 40. Such tube is described only for purposes of illustration of the invention herein disclosed, it being understood that other photosensitive tubes such as an image dissector tube or a Vidicon tube could also be used without departing from the concept of the invention. Although the construction and operation of an image orthicon is well known to those skilled in the art (see page 412 of Reference Data for Radio Engineers, fourth edition, published by International Telephone and Telegraph Corporation, 1957), it is relevant to recall that the important elements are image section 41, scanning section 42, and multiplier section 43. In the image section, light entering lens 44 is focused on photocathode 45. An electron image derived from the photocathode is magnetically focused in the plane of target 46. On the photocathode side of the target is formed a pattern of positive charges that corresponds to the light pattern being televised. In the scanning section, the target is scanned by a low-velocity electron scanner beam 47 produced by scanner beam gun 48. As described in the above publication, a beam of electrons 49, in excess of those required to neutralize the elemental area upon which the beam is focused, is turned back from the target and focused onto five-stage signal multiplier 43. Such excess electrons produce a voltage that is amplitude-modulated in accordance with the charge pattern of the target, whereby the output of photo-multiplier 43 at any instant is a measure of the light intensity of the elemental area upon which the scanner beam is focused at such instant. Deflection coils 50 cause magnetic deflection of beam 47 to accomplish scanning of target 46. The controls for such deflection are shown schematically as orthicon deflection control 51 and azimuth scansion drive 53. Orthicon scanner beam control 52 turns gun 48 on and off as will be described below.

Also shown in FIGURE 3 is cathode ray tube 60 of indicator 18. CRT 60 has electron gun 61 which produces electron beam 62 that strikes screen 19 to produce an unintensified spot at the point on the screen struck by the beam. Deflection coils 63 of CRT 60 control deflection of beam 62. The controls for such deflection are shown schematically as range sweep control 64 and azimuth scansion drive 65. The intensity of beam 62 is controlled by intensity modulator 66 which is in turn connected to photomultiplier 43 of image orthicon tube 40. Actually, modulator 66 may be the control grid of electron gun 61.

In operation, timer 11 causes generator 21 to produce periodic sawtooth voltages at a frequency that is the same as the pulse repetition frequency of an actual radar. Such voltages are applied to the range sweep control 64 of CRT 60 and to controls 51 and 52 of orthicon 40. As to CRT 60, control 64, in response to the voltages, energizes deflection coils 63 in such a manner that beam 62 is radially deflected from the center of screen 19 during the build-up of each sawtooth and quickly returned to the center at the end of each sawtooth. As to orthicon 40, control 52 turns on scanner beam gun 48 during the build-up of each sawtooth and turns off the scanner beam gun during the decay of the sawtooth. Control 51, in response to the sawtooth voltages, energizes deflection coils 50 in such a manner that beam 47 is radially deflected from the center of target 46 during the build-up of each sawtooth and quickly returned to the center at the end of each sawtooth, in synchronism with deflection of beam 62 of CRT 60.

Antenna simulator 34 produces a modulated voltage that is the same as that produced by synchro 20. Such voltage is applied to the azimuth scansion drives 53 and 65 of tube 40 and CRT 60 respectively. As to CRT 60, drive 65, in response to the modulated voltage, rotates deflection coils 63 in such a manner that the path traced by beam 62 is caused to rotate about the center of screen 19. As to orthicon 40, drive 51, in response to the voltages, rotates coils 50 in such a manner that the path scanned by beam 47 is caused to rotate about the center of target 46 in synchronism with rotation of the path on screen 19 of CRT 60. Recalling that target 46 of orthicon 40 is a surface which, in response to the pattern the light focused thereon, produces a corresponding positive-potential pattern, it is apparent that target T on display 31 will cause a corresponding elemental area on the target to have a large positive potential in comparison to adjacent elemental areas. Eventually, the operation of antenna simulator 34 and timer 11 cause beam 47 to strike and neutralize the elemental area on target 46 corresponding to target T. At such time, the video output of photomultiplier 43 applied to modulator 66 causes the intensity of beam 62 to increase, thereby producing on screen 19, an illuminated spot S whose radial displacement from the center of the screen is a measure of the range of target T, and whose angular position on the screen is a measure of the azimuth of target T. To an operator viewing screen 19, the spot thereon appears to be a radar target.

To increase the realism, the beam width of an actual radar can be simulated. Such beam width gives rise to the typical "sausage" shape of a target. To produce this effect, display 31 is mounted for rotation about an axis normal to the plane of the display and passing through the center thereof. As shown in FIGURE 3, rocker means 70 attached to display 31 causes the latter to be rocked back and forth through an angle equal to the radar beam width. The oscillatory motion of display 31 causes the light spot representing target T to be smeared on photocathode 45 which, in turn, causes the charge pattern on target 46 to be smeared. Scanner beam gun 48 reads off the smeared charge pattern producing the desired "sausage" spot on screen 19.

The smearing of the spot can be accomplished electronically as well as mechanically. For example, a sinusoidal voltage having a period slightly less than the time required for beam 47 to traverse the width of the area on target 46 corresponding to the light spot on display 31 can be superimposed on deflection coils 50 of image orthicon 40. This has the effect of smearing the spot so that gun 48 reads-out a smear thereby automatically modulating the display coordinate voltages. Greater authenticity can be achieved if the amplitude of the sinusoid decreases with range since that is the manner in which the "sausage" would actually vary. Another electronic method for smearing the spot is achieved by appropriately modulating the display coordinate voltages; i.e., by modulating the x-deflection plate voltages with a sine wave, and modulating the y-deflection plate voltages with a cosine wave. This latter technique does not affect the output of the orthicon.

While the above description refers to a type P scan, it will be seen that other "two-dimensional" scans can be simulated. For example, in a type B scan (which is the rectangular presentation of the polar form represented by a type P scan), the azimuth bearing and range of targets are presented as abscissa and ordinate, respectively. Here, a uniform vertical motion from bottom to top of screen is given the scanning spot in synchronism with pulses transmitted from the radar antenna. The spot is also given a horizontal motion which corresponds to at least a part of the angle or rotation of the antenna. When an echo is received, the resultant video is impressed on the grid of the CRT of the radar indicator causing a bright spot to appear on the screen. The position of this spot to the right or left of the center line of the screen indicates the azimuth of the target (its angle to the right or left of the radar reference line). The height of the spot above a base line (the start of each vertical deflection of the spot) indicates target slant range.

To simulate a type B scan, then, the radial scanning of target 46 of orthicon 40 is synchronized with the vertical deflections of the scanning spot on the radar indicator, and the angular rotation of scanning beam 47 about the center of target 46 is synchronized with the horizontal deflections of the scanning spot on the radar indicator.

From the above, it is seen that if the radial displacement of the indicium on a display is a measure of a specific value of one target parameter (range, azimuth, or elevation), and the angular position of the indicium is a measure of a specific value of another target parameter, then all that is necessary to present the two parameters on a radar indicator is to scan the display radially in synchronism with the scan of the indicator that displays said one parameter and rotationally in synchronism with the scan of the indicator that displays said other parameter. Modulation of the indicator scanning spot will cause an illumination to appear on the indicator at the specific values of the two target parameters.

As described above, two target parameters of the three measurable by a radar could be displayed by locating the indicium such that the ordinate thereof is a measure of a specific value of one of the desired target parameters and the abscissa is a measure of the other of the desired parameters. To present the desired parameters on a radar indicator, it is necessary to scan the display vertically in synchronism with the scan of the indicator that displays said one desired parameter and horizontally in synchronism with the scan of the indicator that displays the other of said one desired parameter. Modulation of the indicator scanning spot will cause illumination of the indicator screen at the specific values of the two desired parameters.

It can be seen, then, that the positioning of indicia on the display can be in either polar or rectangular form. Because of current interest in type P scan radar target simulation, the final portion of this disclosure deals with the method and means for producing range-azimuth display coordinates in polar form from the Cartesian coordinates of a simulated target. It should be understood, however, that an analogous method will produce the display coordinates of any two of the three parameters and in either polar or rectangular form.

Referring now to FIGURE 4, $T_1$ represents a target having Cartesian coordinates $x_1$, $y_1$, $z_1$ with respect to origin O of reference axes X, Y, Z. The X–Y plane represents the ground and the altitude of the target is measured by the projection of the position vector $\overline{OT_1}$ on the Z-axis. Two radar locations ($R_1$ and $R_2$) are shown in the drawing at different ground locations: $R_1$ has coordinates $x_{R1}$, $y_{R1}$ relative to O, and $R_2$ has coordinates $x_{R2}$, $y_{R2}$ relative to O. Recalling that a radar is capable of measuring the slant range to a target and the azimuth and elevation of the target relative to the radar antenna, coordinate systems are erected at $R_1$ and $R_2$ as shown in the drawing. If the positive Y-axis is assumed to be a reference from which azimuth is measured, target $T_1$ has different specific values of the parameters of range, azimuth, and elevation relative to each radar. For example, relative to radar $R_1$, target $T_1$ has a range $\rho_{11}$, an azimuth $\alpha_{11}$ and elevation $\phi_{11}$; relative to radar $R_2$, target $T_1$ has a range $\rho_{12}$ and azimuth $\alpha_{12}$ and an elevation $\phi_{12}$.

Any two of the three specific values of the parameters of range, azimuth and elevation can be represented on a planar surface as a vector, the magnitude of which is a measure of the specific value of one of the three parameters, the direction of the vector being a measure of the specific value of another of the three parameters. The orthogonal components of such vector are given by the coordinates of its end point and constitute what is termed herein "display coordinates" in polar form. There are three possible display coordinates: (1) range-azimuth display coordinates which define a vector whose magnitude is the slant range of the target to the radar and whose direction is the same as the azimuth bearing of the target relative to the radar; (2) range-elevation display coordinates which define a vector whose magnitude is the slant range of the target to the radar and whose direction is the same as the angle of elevation that the target bears to the radar; and (3) elevation-azimuth display coordinates which define a vector whose magnitude is the value of the angle of elevation of the target to the radar in radians and whose direction is the same as the azimuth bearing of the target.

Referring again to FIGURE 4, the range-azimuth display coordinates of targe $T_1$ relative to radar $R_1$ are determined from the vector $\overline{R_1B}$ which has the same magnitude as that of the vector $\bar{\rho}_{11}$ and which makes an angle $\alpha_{11}$ with the positive Y-axis. From vector analysis:

$$\overline{R_1B} = \frac{|\overline{P_{11}}|}{|\overline{R_1A}|} \overline{R_1A}$$

The orthogonal components of this vector in the horizontal and vertical directions are:

(1) $\quad (RA_{11})_h = (x_1-x_{R1})\sqrt{1+\dfrac{Z_1^2}{(x_1-x_{R1})^2+(y_1-y_R)^2}}$ (2) $\quad (RA_{11})_v = (y_1-y_{R1})\sqrt{1+\dfrac{Z_1^2}{(x_1-x_{R1})^2+(y_1-y_{R1})^2}}$ The values $(RA_{11})h$, $(RA_{11})v$ represent components which if plotted on orthogonal axes would define the end point of a vector whose magnitude is the slant range of target $T_1$ to radar $R_1$ and whose angular direction is the same as the azimuth bearing $\alpha_{11}$ of target $T_1$ to radar $R_1$. Therefore, such values are termed the range-azimuth display coordinates.

The range-azimuth display coordinates of target $T_1$ relative to radar $R_2$ are given by:

(3) $\quad (RA_{12})_h = (x_1-x_{R2})\sqrt{1+\dfrac{Z_1^2}{(x_1-x_{R2})^2+(y_1-y_{R2})^2}}$ (4) $\quad (RA_{12})_v = (y_1-y_{R2})\sqrt{1+\dfrac{Z_1^2}{(x_1-x_{R2})^2+(y_1-y_{R2})^2}}$ The range-elevation slant coordinates of target $T_1$ relative to radar $R_1$ are determined from the vector $\bar{\rho}_{11}$. From vector analysis, $\bar{\rho}_{11} = R_1A + AT_1$. The orthogonal components of vector $\bar{\rho}_{11}$ are:

(5) $\quad (RE_{11})_h = \sqrt{(x_1-x_{R1})^2+(y_1-y_{R1})^2}$ (6) $\quad (RE_{11})_v = Z_1$ The values $(RE_{11})h$, $(RE_{11})v$ represent components which if plotted on horizontal and vertical orthogonal axes would define the end point of a vector whose magnitude is the slant range of target $T_1$ to radar $R_1$ and whose angular direction is the same as the angle of elevation $\phi_{11}$ that the target bears to the radar. Therefore, such values represent the range-elevation display coordinates of target $T_1$ relative to radar $R_1$.

The elevation-azimuth display coordinates of target $T_1$ relative to radar $R_1$ are obtained from the elevation angle $\phi_{11}$ and the azimuth $\alpha_{11}$. From vector analysis:

(6) $\quad \cos \Phi_{11} = \dfrac{\overline{P_{11}} \cdot \overline{R_1A}}{|\overline{P_{11}}||\overline{R_1A}|} = \sqrt{\dfrac{1}{1+\dfrac{Z_1^2}{(x_1-x_{R1})^2+(y_1-y_{R1})^2}}}$ (7) $\quad \Phi_{11} = \sec^{-1}\sqrt{1+\dfrac{Z_1^2}{(x_1-x_{R1})^2+(y_1-y_{R1})^2}}$ (8) $\quad \sin \alpha_{11} = \dfrac{|\overline{R_1A} \times \bar{j}|}{|R_1A|} = \dfrac{(x_1-x_{R1})}{\sqrt{(x_1-x_{R1})^2+(y_1-y_{R1})^2}}$ (9) $\quad \cos \alpha_{11} = \dfrac{\overline{R_1A} \cdot \bar{j}}{|R_1A|} = \dfrac{(y_1-y_{R1})}{\sqrt{(x_1-x_{R1})^2+(y_1-y_{R1})^2}}$ Orthogonal components of the vector $\bar{\Phi}_{11}$ are:

(10) $\quad (EA_{11})_h = \Phi_{11}\sin\alpha_{11} = \dfrac{(x_1-x_{R1})}{\sqrt{(x_1-x_{R1})^2+(y_1-y_{R1})^2}} \sec^{-1}\left(1+\dfrac{Z_1^2}{\sqrt{(x_1-x_{R1})^2+(y_1-y_{R1})^2}}\right)^{\frac{1}{2}}$

(11) $\quad (EA_{11})_v = \Phi_{11}\cos\alpha_{11} = \dfrac{(y_1-y_{R1})}{\sqrt{(x_1-x_{R1})^2+(y_1-y_{R1})^2}} \sec^{-1}\left(1+\dfrac{Z_1^2}{\sqrt{(x_1-x_{R1})^2+(y_1-y_{R1})^2}}\right)^{\frac{1}{2}}$ The values $(EA_{11})h$, $(EA_{11})v$ represent components which if plotted on orthogonal axes would define the end point of a vector whose magnitude is the angle of elevation of target $T_1$ measured from radar $R_1$ and whose angular direction is the same as the azimuth bearing $\alpha_{11}$ of target $T_1$ to radar $R_1$.

In an analogous manner, the display coordinates of target $T_1$ relative to radar $R_2$ can be calculated. As above indicated, the display coordinates are all functions of the Cartesian coordinates of the targets and radar locations. Hence, such coordinates can be computed from given Cartesian coordinates.

From the above equations, any two of the three specific values of target parameters can be reduced to a vector whose orthogonal components are readily determined. If such components, in analogue form, are impressed on the deflection plates of a cathode ray tube, the illuminated spot would be at the end point of the vector. Thus, display 31 can be a cathode ray tube and target T can be an illuminated spot on the screen of the tube. By continuously varying the display coordinates of the target T as by continuously varying the voltages applied to the deflection plates according to a predetermined program, an operator viewing screen 19 of indicator 18 would see what appeared to be a target moving in a predetermined manner.

To accomplish this programmed variation of the indicia of the display, the desired display coordinates must be continuously computed using the equations listed above, and applied to the deflection plates of a CRT. Generally speaking, a target is generated in the form of a signal, either analogue or digital in nature, which represents the three Cartesian coordinates of the target relative to a reference origin. Usually, the coordinates of target relative to the origin at the commencement of "flight" are set into the generator, together with the initial heading and speed. The target generator computes the three components of the target as a function of time. Since a target to be simulated has various characteristics such as certain rates at which it can change altitude, heading, and speed, adjustment of such rates in the generator permits the simulated target to be "flown" from one place to another as if it were an actual target.

Referring now to FIGURE 5, two target generators $100^1$, $100^2$ are shown, although any number could actually be used. A suitable target generator for this purpose is illustrated and described in 1958 Conference Proceedings, Fifth Annual East Coast Conference on Aeronautical and Navigational Electronics, pp. 181–188, in an article entitled "Electronic Air Traffic Control Simulator," by W. H. Rhodes and W. H. Gable. Since their operation is identical, only one target generator will be described, it being assumed that generator $100^1$ is producing the coordinates of target $T_1$ as a function of time, and that it is desired to display target $T_1$ on two radars $R_1$ and $R_2$ at different locations using a type P scan. The initial coordinates at the commencement of "flight" are $x_0$, $y_0$, $z_0$. A target operator is assumed to have selected the initial heading $\theta_0$ and the initial speed $V_0$ so that the instantaneous coordinates of target $T_1$ are $x_1$, $y_1$, $z_1$. These coordinates are preferably in digital form and are supplied serially to computer 101 through connection 102. Computer 101 may suitably be a standard commercially available computer of several different makes including DDP–19 available from Computer Control Company, Inc., Framingham, Massachusetts, or CDC–1604, made by Control Data Corporation, or any other suitable computer capable of accepting two or more sets of three input variables and being programmed to solve the Equations 1 through 4 given supra, and yielding corresponding pairs of individual digital outputs corresponding to $(RA_{11})x$, $(RA_{11})y$, etc. Note that target generator $100^2$ supplies coordinates $x_2$, $y_2$, $z_2$ of target $T_2$ to computer 101. Since a type P scan is to be simulated, Equations 1 through 4 are digitally solved by the computer into which the initial radar locations $x_{R1}$, $y_{R1}$ and $x_{R2}$, $y_{R2}$ are fed. In general, the output of the computer in serial form is: $(RA_{11})h$, $(RA_{11})v$, the range-azimuth display coordinates of target $T_1$ relative to radar $R_1$; $(RA_{21})h$, $(RA_{21})v$, the range-azimuth display coordinates of target $T_2$ relative to radar $R_1$; $(RA_{12})h$, $(RA_{12})v$, the range-azimuth display coordinates of target $T_1$ relative to radar $R_2$; and $(RA_{22})h$, $(RA_{22})v$, the range-azimuth display coordinates of target $T_2$ relative to radar $R_2$. For reasons of clarity of presentation of the drawing, target $T_2$ is not shown in either FIGURE 4 or FIGURE 5. The display coordinates of the targets relative to radar $R_1$ are converted from digital form to analogue form in digital-to-analogue converter $103^1$ and while the display coordinates of the targets relative to radar $R_2$ are converted in converter $103^2$. The output of a given converter is pairs of voltages which are the analogues of the display coordinates of the targets relative to a given radar.

The pairs of voltages for the different targets are connected sequentially to the horizontal and vertical deflection plates of a cathode ray tube by means of a multiplexer. The persistence of the spot formed when a given pair of voltages are impressed on the CRT permits all the targets to be displayed on one tube. Thus, the output of converter $103^1$ is fed to multiplexer $104^1$ and the output of converter $103^2$ is fed to multiplexer $104^2$. Only the display coordinates of target $T_1$ relative to the two radars are shown. As above described, the voltages $(RA_{11})h$, and $(RA_{11})v$ applied to the plates of cathode ray tube $105^1$ cause a spot $T_1^1$ to appear on the screen. Spot $T_1^1$ makes an angle $\alpha_{11}$ with the vertical, such angle being the azimuth of target $T_1$ relative to radar $R_1$. Spot $T_1^1$ is radially displaced from the center of tube $105^1$ a distance proportional to the magnitude of the slant range vector $\bar{\rho}_{11}$. Similarly, voltages $(RA_{12})h$, and $(RA_{12})v$ are applied to CRT $105^2$ and cause spot $T_1^2$ to appear on the screen. Spot $T_1^2$ makes an angle $\alpha_{12}$ with the vertical, such angle being the azimuth of target $T_1$ relative to radar $R_2$. Spot $T_1^2$ is radially displaced from the center of tube $105^2$, a distance proportional to the magnitude of the slant range vector $\bar{\rho}_{12}$.

CRT's $105^1$ and $105^2$ thus form displays similar to display 31. In actual practice, a TV camera and a CRT for each radar is required. As target $T_1$ is flown along a flight path relative to origin O, computer 101 continuously solves the above equations and permits the spots $T_1^1$ and $T_1^2$ to move such that the range and azimuth of each spot gives the proper range and azimuth of the target $T_1$ relative to each radar.

Those skilled in the art can now appreciate how the present invention eliminates the need for gating video information to the indicator, since this is achieved automatically. In addition, it can now be seen that coordinate conversion and gating is accomplished on a per radar basis without regard to the number of target generators being utilized.

We claim:

1. Simulator apparatus comprising electromagnetic substantially point spot indicium display means including electromagnetic-beam-forming means, a display surface responsive to impingement of said beam thereon to form a spot indicia thereon, and means for positioning said beam as a function of the transient spatial coordinates of a target to be simulated, to thereby permit formation of a movable electromagnetic display of at least one target indicium on said display surface as a non-sweep substantially continuously displayed point spot indicative of target transient location, electromagnetic-beam scanning means for scanning said display in a desired sweep motion, visual display means including a visual display screen having a decaying-after-display characteristic, said visual display means being responsive to said beam scanning means for forming a sweep-type recurring visual display of said target indicium on said visual display screen as modified by said sweep, signal modifying means for effecting formation of said visual display of said target indicium in a modified shaped form with respect to the form of said point spot indicium, the beam sweep of said beam scanning means and the sweep display of said visual display being of type P and being synchronized in a one-to-one relation, said signal modifying means effecting formation of said visual display of said target indicium as an arcuately widened spot as compared to said point spot target indicator display indicium.

2. Apparatus according to claim 1 wherein said signal modifying means includes means for imparting relative oscillatory motion between said first mentioned means forming a point spot display and said beam scanning means and being in a direction along the line of said angular sweep motion.

3. Simulator apparatus comprising electromagnetic substantially point spot indicium display means including electromagnetic-beam-forming means, a display surface responsive to impingement of said beam thereon to form a spot indicia thereon, and means for positioning said beam as a function of the transient spatial coordinates of a target to be simulated, to thereby permit formation of a movable electromagnetic display of at least one target indicium on said display surface as a non-sweep substantially continuously displayed point spot indicative of target transient location, electromagnetic-beam scanning means for scanning said display in a desired sweep motion, visual display means including a visual display screen having a decaying-after-display characteristic, said visual display means being responsive to said beam scanning means for forming a sweep-type recurring visual display of said target indicium on said visual display screen as modified by said sweep, signal modifying means for effecting formation of said visual display of said target indicium in a modified shaped form with respect to the form of said point spot indicia, said signal modifying means including means for imparting relative oscillatory motion between said first mentioned means forming a point spot display and said beam scanning means and being in a direction back-and-forth normal to the line of direction of said sweep motion.

4. Apparatus according to claim 3 wherein said means for imparting relative oscillatory motion includes means for oscillating said point spot display means.

5. Apparatus according to claim 4 wherein said point spot display means is a cathode ray tube having a display screen, and rocker means operatively connected to one of said cathode ray tube and said beam scanning means for rocking movement with respect to one another.

6. Simulator apparatus comprising electromagnetic substantially point spot indicium display means including electromagnetic-beam-forming means, a display surface responsive to impingement of said beam thereon to form a spot indicia thereon, and means for positioning said beam as a function of the transient spatial coordinates of a target to be simulated, to thereby permit formation of a movable electromagnetic display of at least one target indicium on said display surface as a non-sweep substantially continuously displayed point spot indicative of target transient location, electromagnetic-beam scanning means for scanning said display in a desired sweep motion, visual display means including a visual display screen having a decaying-after-display characteristic, said visual display means being responsive to said beam scanning means for forming a sweep-type recurring visual display of said target indicium on said visual display screen as modified by said sweep, converter means for converting three signals representing the $x, y, z$ Cartesian coordinates of range, azimuth and elevation of a given target, relative to a reference point, to two analog signals representing the combination of $x, y$ and $z$ signals as two desired display coordinates, said point indicium display means being responsive to the value of said two analog signals, and said point spot being a function of said two desired coordinates, and computer means for modifying said two display coordinates as a function of velocity and course variables.

7. Simulator apparatus comprising electromagnetic substantially point spot indicium display means including electromagnetic-beam-forming means, a display surface responsive to impingement of said beam thereon to form a spot indicia thereon, and means for positioning said beam as a function of the transient spatial coordinates of a target to be simulated, to thereby permit formation of a movable electromagnetic display of at least one target indicium on said display surface as a non-sweep substantially continuously displayed point spot indicative of target transient location, electromagnetic-beam scanning means for scanning said display in a desired sweep motion, visual display means including a visual display screen having a decaying-after-display characteristic, said visual display means being responsive to said beam scanning means for forming a sweep-type recurring visual display of said target indicium on said visual display screen as modified by said sweep, converter means for converting two sets of three signals representing the $x, y, z$ Cartesian coordinates of range, azimuth and elevation of two given targets, relative to reference point, to two sets of two analog signals representing the combination of $x, y$ and $z$ signals as two sets of two desired display coordinates, said point spot indicium display means being responsive to the value of each of said sets of two analog signals, to produce corresponding respective point spot indicia, and said point spots being a function of said two desired coordinates, and multiplexer means operatively connected between said converter means and said point spot indicium display means to sequentially feed each pair of said display coordinate signals from said respective converters to said point spot indicium display means.

8. Simulator apparatus comprising means for generating two sets of spatial coordinate digital signals corresponding to the respective transient spatial position parameters of first and second movable targets relative to a reference position, digital-to-analog converter means for converting said sets of digital signals to analog signals, an indicia display device having electromagnetic beam indicia forming and positioning means and an electromagnetic-beam-responsive surface on which electromagnetic-beam-induced indicia are displayed, multiplexer means for sequentially and repetitively modifying said indicia forming and positioning means to form a respective effectively substantially continuous spot display on said surface as a function of each of said analog signals, and electromagnetic beam scanning means for scanning said surface in a desired sweep motion, visual display means including a visual display screen having a decaying-after-display characteristic, said visual display means being responsive to said electromagnetic beam scanning means for forming a sweep-type recurring visual display of said target indicium on said visual display screen as modified by said sweep.

9. Apparatus according to claim 8 further comprising signal modifying means for effecting formation on said visual display of each of the indicia corresponding to said targets in a modified shaped form with respect to the form of said indicia on said surface, to thereby more realistically display said indicia on said visual display screen.

References Cited in the file of this patent

UNITED STATES PATENTS

| | | |
|---|---|---|
| 2,215,365 | Vestergren | Sept. 17, 1940 |
| 2,534,610 | Marcy | Dec. 19, 1950 |
| 2,677,199 | Droz | May 4, 1954 |
| 2,720,039 | Brown | Oct. 11, 1955 |
| 2,740,205 | Shamis et al. | Apr. 3, 1956 |
| 2,771,593 | Straehl | Nov. 20, 1956 |
| 2,774,149 | Garman et al. | Dec. 18, 1956 |
| 2,788,588 | Lindley | Apr. 16, 1957 |
| 2,811,789 | Paine | Nov. 5, 1957 |
| 2,824,271 | Anderson et al. | Feb. 18, 1958 |
| 2,856,701 | Leskinen | Oct. 21, 1958 |
| 2,859,538 | Cutler | Nov. 11, 1958 |
| 2,889,635 | Johnson | June 9, 1959 |
| 2,889,636 | Van Alstyne et al. | June 9, 1959 |
| 2,929,157 | Johnson | Mar. 22, 1960 |
| 2,938,278 | Brown | May 31, 1960 |
| 2,944,346 | Coburn et al. | July 12, 1960 |
| 2,951,297 | Colker | Sept. 6, 1960 |
| 2,953,688 | Maxwell | Sept. 20, 1960 |
| 2,972,742 | Ross | Feb. 21, 1961 |
| 3,018,053 | Alpers | Jan. 23, 1962 |
| 3,068,466 | Lindley | Dec. 11, 1962 |